(12) United States Patent
Amro et al.

(10) Patent No.: US 6,335,745 B1
(45) Date of Patent: Jan. 1, 2002

(54) METHOD AND SYSTEM FOR INVOKING A FUNCTION OF A GRAPHICAL OBJECT IN A GRAPHICAL USER INTERFACE

(75) Inventors: Hatim Yousef Amro, Austin; John Paul Dodson, Pflugerville, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/256,376

(22) Filed: Feb. 24, 1999

(51) Int. Cl.⁷ .................................................. G09G 5/00
(52) U.S. Cl. ...................... 345/835; 345/781; 345/795; 345/847
(58) Field of Search ................................ 345/333, 340, 345/326, 334, 348, 700, 835, 716, 781, 765

(56) References Cited

U.S. PATENT DOCUMENTS

| | | | |
|---|---|---|---|
| 5,617,526 A | * 4/1997 | Oran et al. | 345/326 |
| 5,757,371 A | * 5/1998 | Oran et al. | 345/348 |
| 5,777,616 A | 7/1998 | Bates et al. | 345/339 |
| 6,028,602 A | * 2/2000 | Weidenfeller et al. | 345/340 |
| 6,141,003 A | * 10/2000 | Chor et al. | 345/327 |
| 6,175,363 B1 | * 1/2001 | Williams et al. | 345/334 |
| 6,215,490 B1 | * 4/2001 | Kaply | 345/340 |

* cited by examiner

*Primary Examiner*—Raymond J. Bayerl
*Assistant Examiner*—Tadesse Hailu
(74) *Attorney, Agent, or Firm*—Bracewell & Patterson, LLP; J. Bruce Schelkopf

(57) ABSTRACT

A data processing system and method of efficiently invoking a function within a data processing system wherein the data processing system includes a processing unit, a display device that displays graphical objects in response to receipt of signals from the processing unit, and a graphical user interface (GUI) manager stored within the memory and executable by the processing unit. A graphical application is displayed within the display device. The graphical application has an associated graphical window and an associated graphical selection area. After iconizing the graphical application such that the associated graphical window and associated graphical selection area are no longer displayed, in response to a selection of the iconized graphical application, only the associated graphical selection area is opened. Thereafter, in response to a selection of a particular region among multiple regions, the function associated with the particular region is performed without displaying the associated graphical window.

26 Claims, 9 Drawing Sheets

METHOD AND SYSTEM FOR INVOKING A FUNCTION OF A GRAPHICAL OBJECT IN A GRAPHICAL USER INTERFACE

BACKGROUND OF THE INVENTION

1. Field of the Invention

The present invention relates in general to an improved method and system for data processing and in particular to an improved data processing system and method for invoking a function within a graphical user interface. Still more particularly, the present invention relates to an improved data processing system and method for invoking one of the functions displayed within a graphical user interface.

2. Description of the Related Art

The development and proliferation of graphical user interfaces (GUIs) has greatly enhanced the ease with which users interact with data processing systems. A conventional GUI display includes a desktop metaphor upon which one or more icons, application windows, or other graphical objects are displayed. Typically, a data processing system user interacts with a GUI display utilizing a graphical pointer which the user controls with a graphical pointing device, such as a mouse, trackball, or joystick. For example, depending upon the actions allowed by the active application or operation system software, the user can select icons or other graphical objects within the GUI display by positioning the graphical pointer over the graphical object and depressing a button associated with the graphical pointing device. In addition, the user can typically relocate icons, application windows, and other graphical objects on the desktop utilizing the well know "drag-and-drop" technique. By manipulating the graphical objects within the GUI display, the user can control the underlying hardware devices and software objects represented by the graphical objects in a graphical and intuitive manner. Keyboard strokes may also be utilized to navigate about the graphical user interface and for making selections of graphical objects within the GUI.

Conventional GUIs often include an application bar or menu which displays iconified graphical objects representing those applications which are currently running and active in memory. The user can quickly switch between open applications by selecting the graphical objects representing the application. In addition, a user may dismiss the current application and remove the graphical display associated with the application from the GUI without exiting the application. Upon dismissing the application, an iconified graphical object representing the application is typically displayed.

Typically, an application includes a graphical selection area with multiple bars and one or more graphical windows. The graphical selection area preferably includes multiple pull-down menus with textual representations which invoke functions when selected. In addition, the graphical selection area may include multiple graphical objects and icons which also invoke functions when selected. A title bar is also typically included in a graphical selection area. Graphical windows contain program supported data. For example, a word processor utilizes a graphical window which may contain text and other graphics entered by the user. A mail program utilizes a graphical window which may display text from a received mail message.

Conventionally, when the graphical object representing any application is selected from the active application bar, the graphical display associated with the application is restored. Any graphical windows which were open when the application was dismissed will be restored when the application is selected again. In addition, the graphical selection area is restored.

In some cases, a user may only need access to an application's graphical selection area to invoke a desired function, however to gain access to the graphical selection area, the application, including any graphical windows and graphical selection areas, must be restored and displayed. Three disadvantages exist to accessing a graphical selection area in the conventional manner. First, memory is required to restore graphical display associated with the application, including paging in the required data to restore any open graphical windows. Second, the performance of the data processing system is compromised because the user must wait for all parts of the graphical display associated with the application to be restored and possibly reloaded into memory. Third, screen real estate is needlessly consumed to restore the entire graphical display associated with the application onto the screen.

As should thus be apparent, an improved GUI is needed that permits a user to access only a graphical selection area of an application from the iconified graphical objects which represent applications in order to invoke a function from the graphical selection area.

SUMMARY OF THE INVENTION

It is therefore one object of the present invention to provide an improved method and system for data processing.

It is another object of the present invention to provide an improved data processing system and method for invoking a function within a graphical user interface.

It is yet another object of the present invention to provide an improved data processing system and method for invoking one of the functions of a graphical selection area displayed within a graphical user interface.

The foregoing objects are achieved as is now described. A data processing system and method of efficiently invoking a function within a data processing system is provided wherein the data processing system includes a processing unit, a display device that displays graphical objects in response to receipt of signals from the processing unit, and a graphical user interface (GUI) manager stored within the memory and executable by the processing unit. A graphical application is displayed within the display device. The graphical application has an associated graphical window and an associated graphical selection area. After iconizing the graphical application such that the associated graphical window and associated graphical selection area are no longer displayed, in response to a selection of the iconized graphical application, only the associated graphical selection area is opened. Thereafter, in response to a selection of a particular region among multiple regions, the function associated with the particular region is performed without displaying the associated graphical window.

The above as well as additional objects, features and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
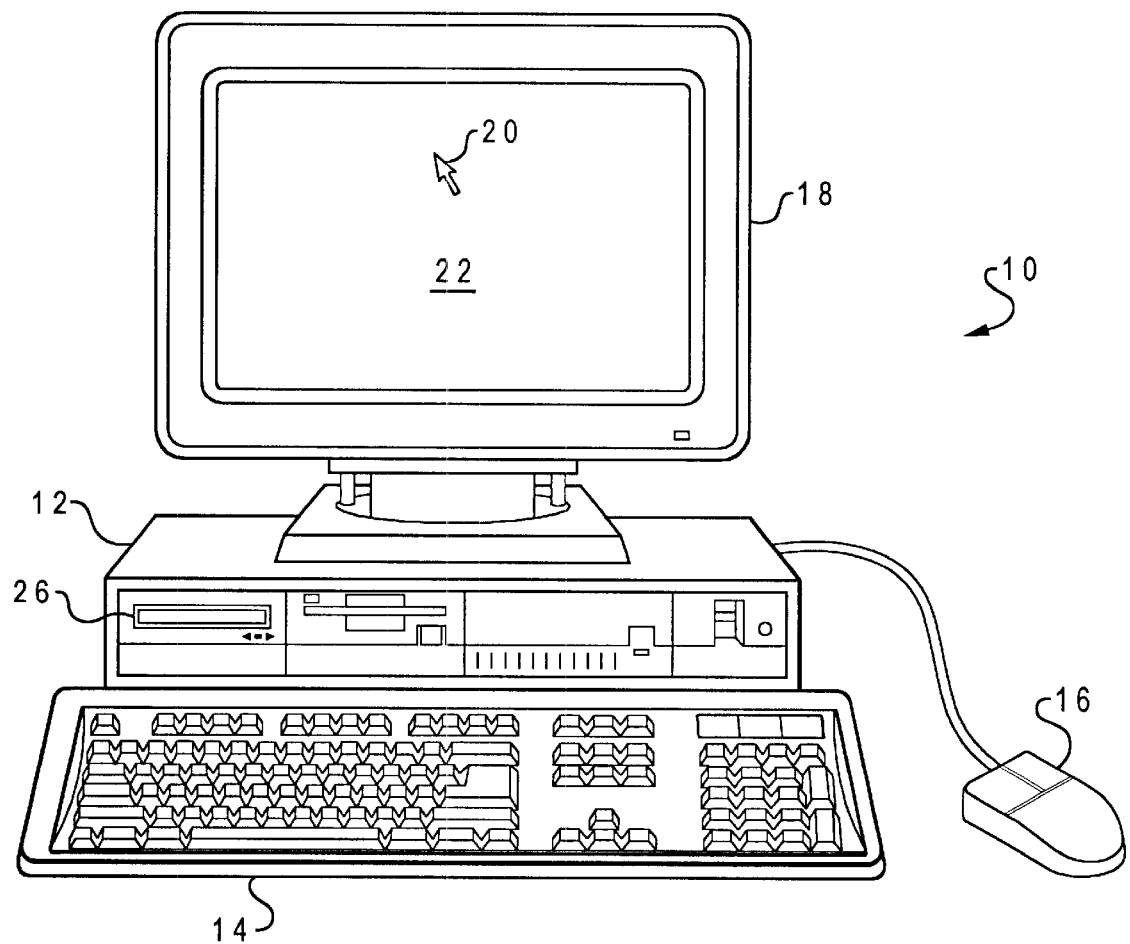
FIG. 1 depicts a pictorial illustration of a data processing system that can be utilized to implement the present invention.

Referring now to the figures and in particular with reference to FIG. 1, there is illustrated a pictorial representation of a data processing system 10 such as a personal computer which utilizes an operating system. Data processing system 10 comprises processor unit 12, keyboard 14, mouse 16, and video display (or monitor) 18. Keyboard 14 and mouse 16 constitute user input devices, and video display 18 constitutes an user output device. Mouse 16 is a graphical pointing device utilized to control cursor 20, or graphical pointer, displayed on display screen 22 of video display 18. Those skilled in the art will recognize that other graphical pointing devices, such as a graphics tablet, joystick, trackball, or trackpad may also be utilized. To support storage and retrieval of data, processor unit 12 further comprises a floppy disk drive 24 and a compact disk drive 26 which are interconnected with other components of processor unit 12 in a well-known manner. Of course, those skilled in the art are aware that additional conventional components can also be connected to processor unit 12.

Data processing system 10 supports a Graphical User Interface (GUI) which allows a user to "point-and-click" by moving cursor 20 to an icon or specific location on screen 22 via mouse 16 and then depressing one of the buttons on mouse 16 in order to perform a user command. Upon depressing one of the buttons on mouse 16, a switch associated with the depressed button is closed which sends a selection signal to data processing system 10

Figure 2:
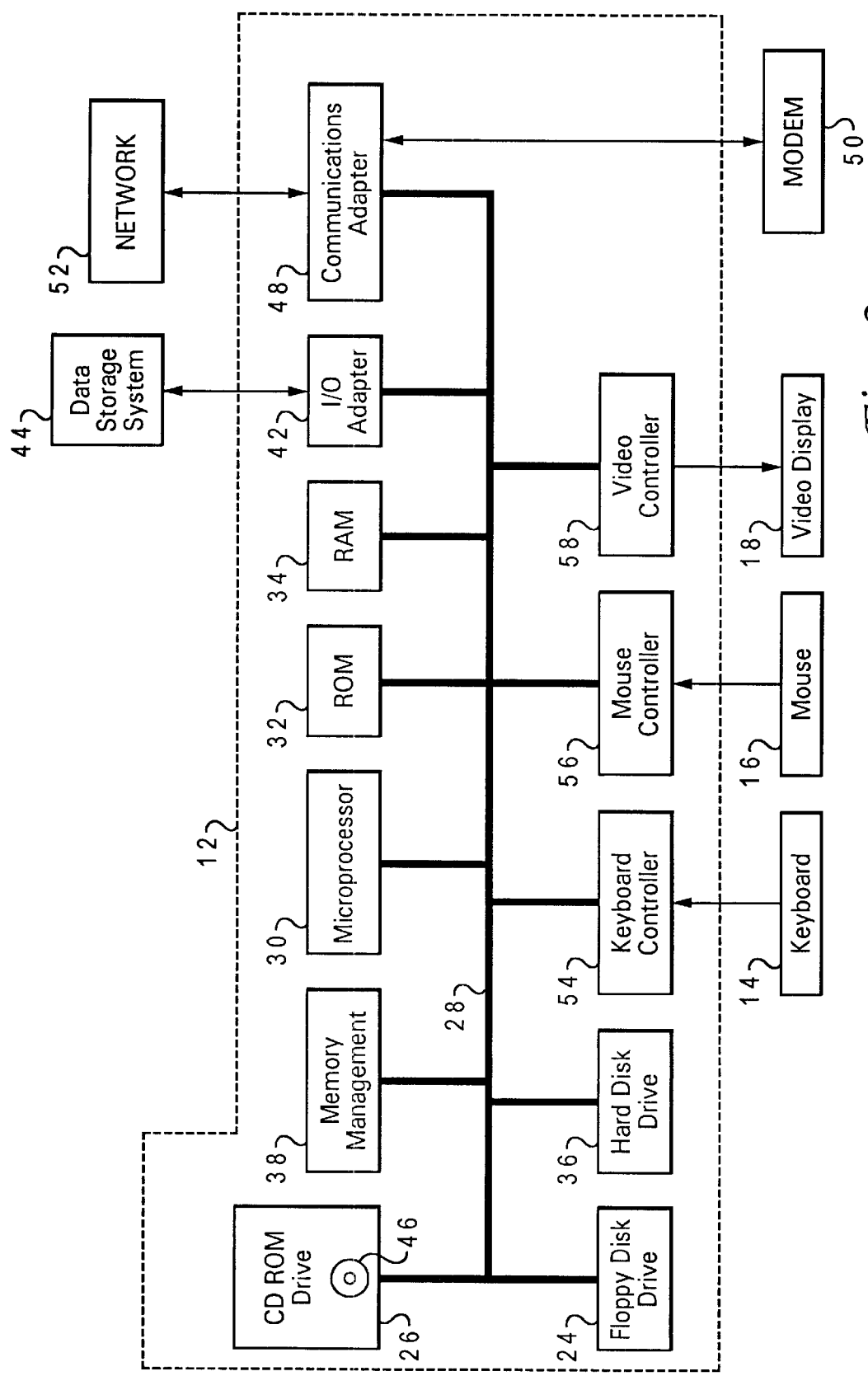
FIG. 2 illustrates a functional block diagram representation of a processing unit of the data processing system illustrated in FIG. 1.

With reference now to FIG. 2, there is depicted a functional block diagram of data processing system 10 illustrated in FIG. 1. Processor unit 12 includes a system bus 28 to which various functional blocks are attached and by which communications among various functional blocks are accomplished. Microprocessor 30, connecting to system bus 28, is supported by read only memory (ROM) 32 and random access memory (RAM) 34, both of which are connected to system bus 28.

ROM 32 contains, among other code, the Basic Input/Output System (BIOS) or other firmware which controls certain basic hardware operations, such as interactions of hard disk drive 36 and floppy disk drive 24. In addition, a plurality of routines are typically stored in ROM 32 where each routine typically contains multiple processor steps. Each routine may also be represented as a function to be performed on data or executed. RAM 34 is the main memory within which the operating system having the present invention incorporated and other application programs operate within. As will be appreciated by those skilled in the art, RAM 34 comprises a number of individual volatile memory modules which store segments of operation system and application software while power is supplied to data processing system 10. A memory management device 38 is connected to system bus 28 for controlling all Direct Memory Access (DMA) operations such as paging data between RAM 34 and hard disk drive 36 or floppy disk drive 24.

Referring still to FIG. 2, an I/O adapter 42 is illustrated connected to system bus 28 for providing an interface for data storage peripheral devices such as data storage system 44. Additional I/O adapters may be included to expand the storage capacity accessible by data processing system 10.

Another peripheral device illustrated includes compact disk drive 26 having a compact disk 46 inserted therein which is installed within processor unit 12. Other peripheral devices such as optical storage media, printers, etc. may also be added to data processing system 10. Further, a communications adapter 48 may be utilized to communicate with other data processing systems (not shown). Communications adapter 48 may support modem 50 or a local area network (LAN) 52 link such as an ethernet link which allows data processing system 10 to communicate with other data processing systems. Modem 50 supports communication between data processing system 10 and another data processing system over a standard telephone line or ISDN line. For example, modem 50 may be utilized to connect data processing system 10 to an on-line information service. Furthermore, through modem 50, data processing system 10 can access other sources of software, such as a server, an electronic bulletin board, and the Internet. LAN 52 provides a user of data processing system 10 with a means of electronically communicating information, including software, with a remote computer or a network logical storage device. Additionally, LAN 52 supports distributed processing, which enables data processing system 10 to share a task with other data processing systems linked to LAN. In addition to modem 50 and LAN 52, communications adapter 48 may support other communication means.

To complete the description of processor unit 12, there are three input/output (I/O) controllers, namely, keyboard controller 54, mouse controller 56 and video controller 58, all of which are connected to system bus 28. As their names imply, keyboard controller 54 provides the hardware interface for keyboard 14, mouse controller 56 provides the hardware interface for mouse 16, and video controller 58 provides the hardware interface for video display 18.

Figure 3:
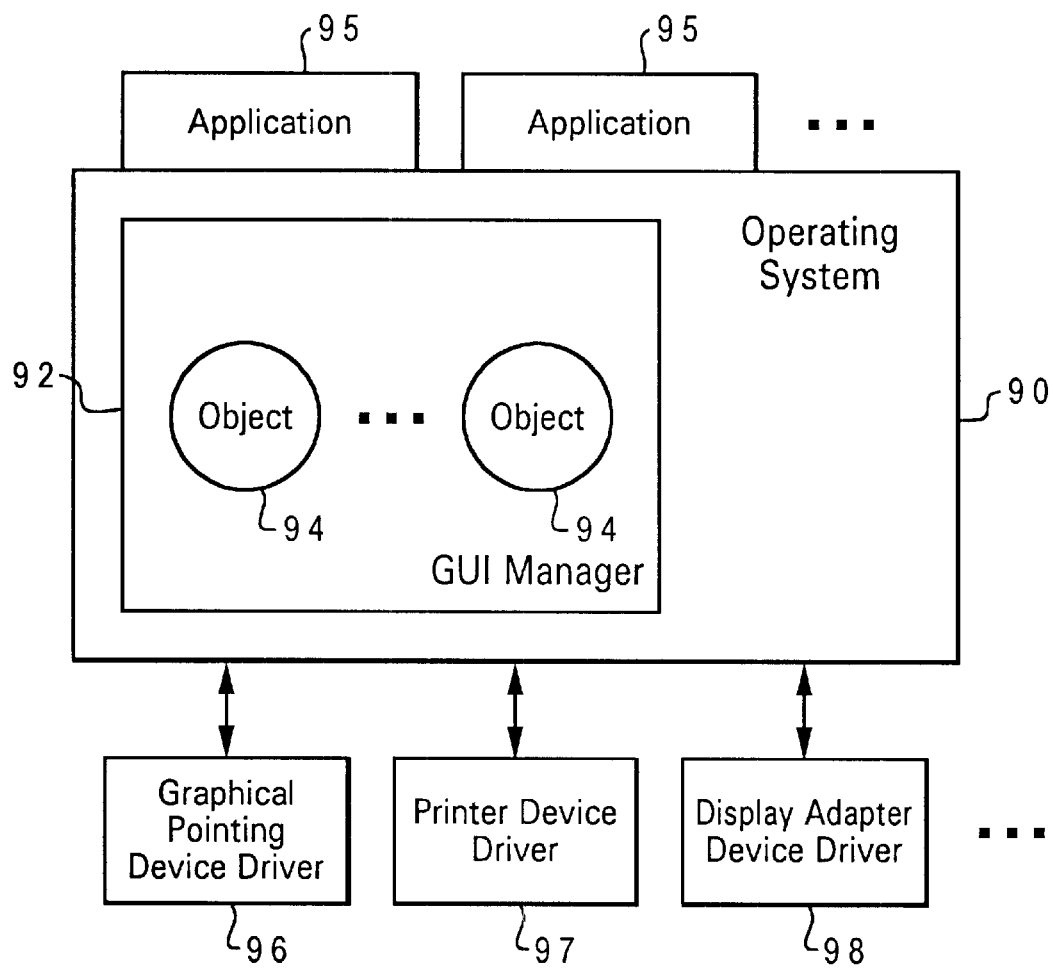
FIG. 3 depicts a functional block diagram representation of a graphical user interface (GUI) manager and other software stored within the memory of the data processing system depicted in FIG. 1.

With reference now to FIG. 3, there is illustrated a pictorial representation of the software configuration of data processing system 10 in accordance with the present invention. As noted above, the software executed by data processing system 10 can be stored within one or more of RAM 34, the nonvolatile storage provided by floppy disk drive 24, hard disk drive 36, and CD-ROM drive 26, or a remote server accessible via modem 50 or a LAN 52. As illustrated, the software configuration of data processing system 10 includes an operating system (OS) 90 which is responsible for managing the allocation and usage of the resources of data processing system 10, for example, by assigning CPU time to various execution threads and allocating portions of RAM 34 for use by various user applications 95.

In accordance with the present invention, OS 90 includes a graphical user interface (GUI) manager 92 that manages the GUI with which a user of data processing system 10 interacts. Although GUI manager 92 can be structured in a variety of ways, GUI manager 92 preferably comprises a software object with which one or more software objects 94 are registered. Software objects 94, which each manage an associated graphical object displayed within display screen 100 through one or more methods, include both operating system and application software objects. Thus, although software objects 94 may include methods and data that are not necessarily a part of OS 90, all software objects 94 have methods which influence the presentation of graphical objects within display screen 100 are a component of GUI manager 92 for the purpose of the present application and are illustrated as such in FIG. 3 for the sake of simplicity.

OS 90 communicates with applications 95 through messages (called events upon receipt) conforming to the syntax of the application programming interface (API) supported by OS 90. OS 90 further communicates with graphical pointing device driver 96 and display adapter device driver 98. For example, OS 90 sends graphics data that specify display parameters and content to display adapter device driver 98, which in turn translates the messages into bus signals utilized to control video controller 58. In addition, graphical pointing device driver 96 translates signals received from mouse 16 through keyboard controller 54 and mouse controller 56 into Cartesian coordinates and a selection status, which are then related to GUI manager 92. GUI manager 92 in turn sends messages containing the Cartesian coordinates and selection status to registered software objects 94.

Figure 4:
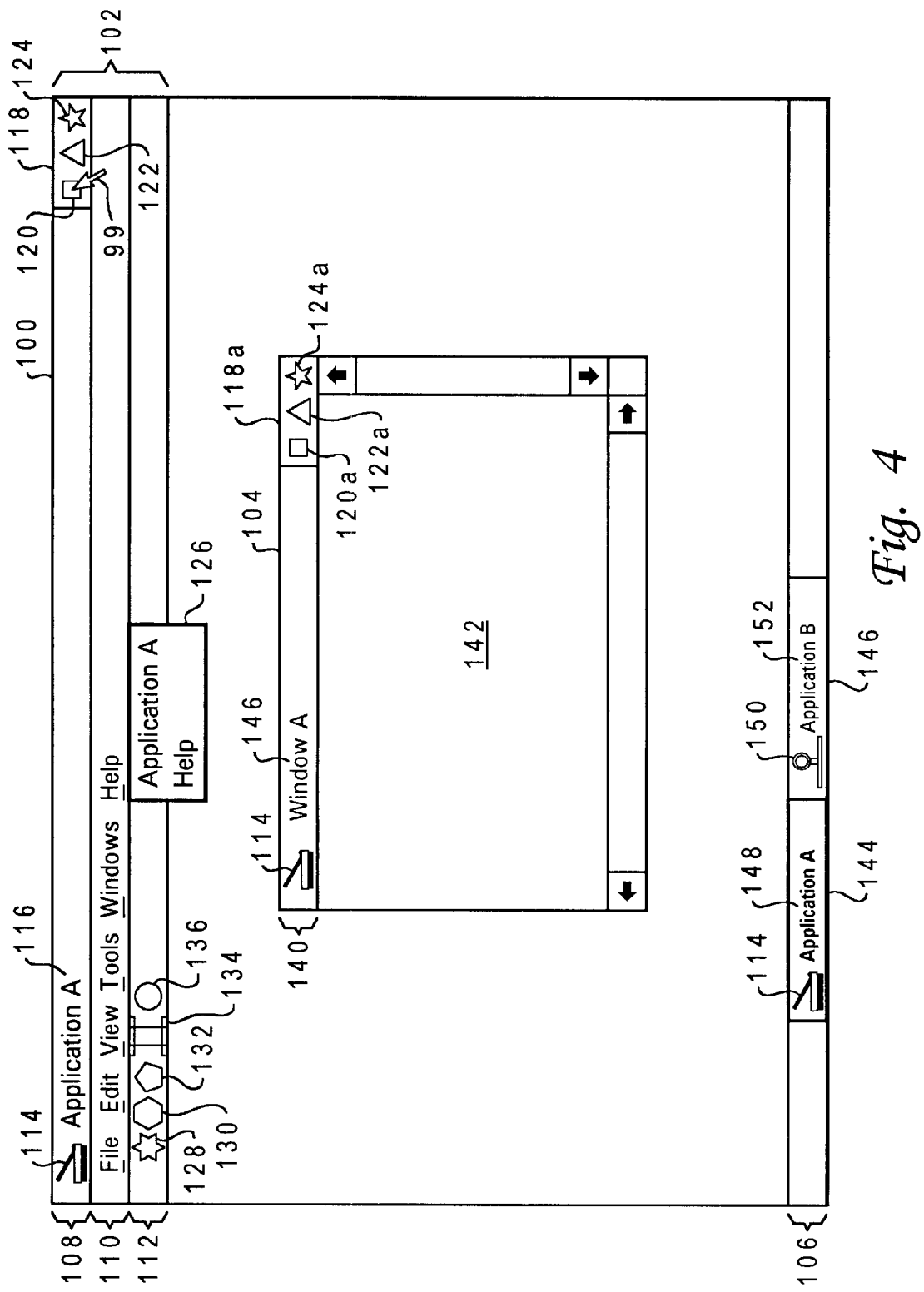
FIG. 4 illustrates a graphical user interface (GUI) display in accordance with the present invention where a graphical selection area and a graphical window are displayed for an application.

Referring now to FIG. 4, there is depicted a graphical user interface (GUI) display in accordance with the present invention where a graphical selection area and a graphical window are displayed for an application. FIGS. 4–7 apply to any applications which may be viewed within a graphical user interface. Particularly applicable to the present invention are browser applications. As illustrated, within display screen 100, a graphical selection area 102, graphical window 104 and active application bar 106 are displayed. An application A is represented in graphical selection area 102 and graphical window 104. Graphical selection area 102 further includes a title bar 108, a pull-down menu bar 110 and an icon function bar 112.

Title bar 108 displays an application icon 114, a textual title of "Application A" depicted at reference number 116, and a decoration field 118. Decoration field 118 further includes regions which each represent a distinct display function selectable by the user for execution. In the present example, three regions represented by icons 120, 122, and 124 are illustrated where each icon represents a distinct display function. For example, execution of a display function may increase or decrease the size of the graphical selection area 102, dismiss the application from display screen 100 or exit the application, thus closing all graphical display associated with the application and removing it from active application bar 106.

Pull-down menu bar 110 includes multiple textual graphical objects which are selectable. Upon selecting a region occupied by a textual graphical object, such as "Help", a pull-down menu appears as illustrated at reference number 126. A pull-down menu further includes at least one textual graphical object which is selectable to execute a function. For example, the pull-down menu as illustrated at reference numeral 126 includes a "Application A Help" graphical object which upon selection of a region occupied by the graphical object executes a help application which will typically open a new window in the current screen display. The user may derive help information from the new help window for proper operation of the current application. Functions may include processes executable to data within open graphical windows within the opened application program, execution of functions in other applications or opening of an additional application within the current application, such as the help application, or opening a new application in addition to the application currently displayed.

With reference still to FIG. 4, within icon function bar 112, multiple icons are depicted which upon selection of the region occupied by the icon, execute a function. In the present example, icons 128, 130, 132, 134, and 136 are illustrated. Each icon is typically also represented by a textual graphical object in a pull-down menu. In many applications it is preferable that the user may launch an additional application by selecting an icon from icon function bar 112. For example, in a mail application, it is desirable that the user may launch a browser application from an icon in the mail application.

Graphical window 104 includes a standard window title bar 140 which includes application icon 114, a textual window title "Window A" as illustrated at reference numeral 146, and decoration field 118*a* including icons 120*a*, 122*a* and 124*a*. Data display area 142 may include text and/or graphics supported by the application in which graphical window 104 is displayed within.

Referring still to FIG. 4, active application bar 106 includes active graphical objects 144 and 146. Each active graphical object is associated with a particular application. In the example depicted, active graphical object 144 includes application icon 114 and a textual title "Application A" as illustrated at reference numeral 148. Therefore, the active graphical object is associated with Application A which is also the application currently displayed within display screen 100. Since Application A is currently displayed, the active graphical object 144 is altered to distinguish active graphical object 144 as the active graphical object which is currently displayed. In contrast, active graphical object 146 is associated with "Application B" as indicated at reference numeral 152 and with an application icon 150. Application B is not currently displayed within display screen 100, however is active in memory.

A graphical pointer 99 is illustrated in FIG. 4, distinguished above decoration field icon 120. In particular, decoration field icon 120 is associated with the window event function which dismisses the application associated with graphical selection area 102. In the present position of graphical pointer 99, if the user selects icon 120 by depressing a button on mouse 16, graphical selection area 102 and graphical window 142 are removed from display screen 100 by the graphical user interface manager.

Figure 5:
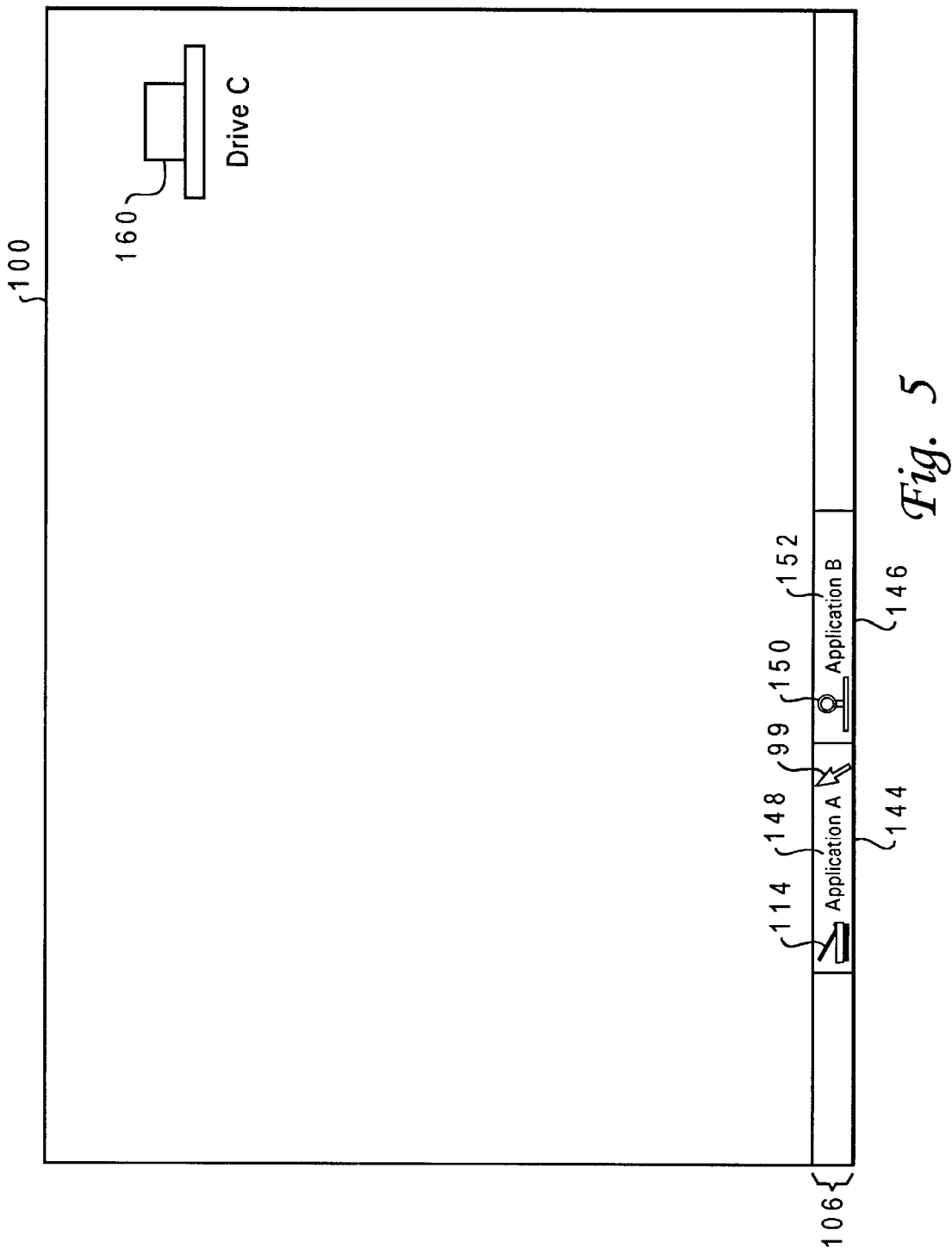
FIG. 5 depicts a graphical user interface (GUI) display in accordance with the present invention that permits a user to select a graphical representation of an application from among currently active applications.

With reference now to FIG. 5, there is depicted a graphical user interface (GUI) display in accordance with the present invention that permits a user to select a graphical representation of an application from among currently active applications. In the example, an icon 160 is depicted which represents a data storage device "Drive C." No application programs are currently displayed within display screen 100. The user may select either of the active applications A or B represented by active graphical objects 144 and 146. In addition, the user may select icon 160 and access any applications or data files stored within Drive C for execution. Typically, an application or data file is selected from Drive C or other data storage device to initially execute an application. However, applications and data files may also be initiated within an open application.

Graphical pointer 99 is depicted in FIG. 5, positioned over graphical object 144. In particular, graphical object 144 is associated with the window event function which opens the application associated therewith. In the present position of graphical pointer 99, if the user selects graphical object 144 by depressing a button on mouse 16, graphical selection area 102 and graphical window 142 would be opened within display screen 100 by the graphical user interface manager as previously displayed in FIG. 4. However, in the present position of graphical pointer 99, if the user selects graphical object 144 by depressing a button on mouse 16 and in conjunction enters a second input, such as a keystroke, only graphical selection area 102 would be opened within display screen 100 by the graphical user interface manager as illustrated in FIG. 6.

Figure 6:
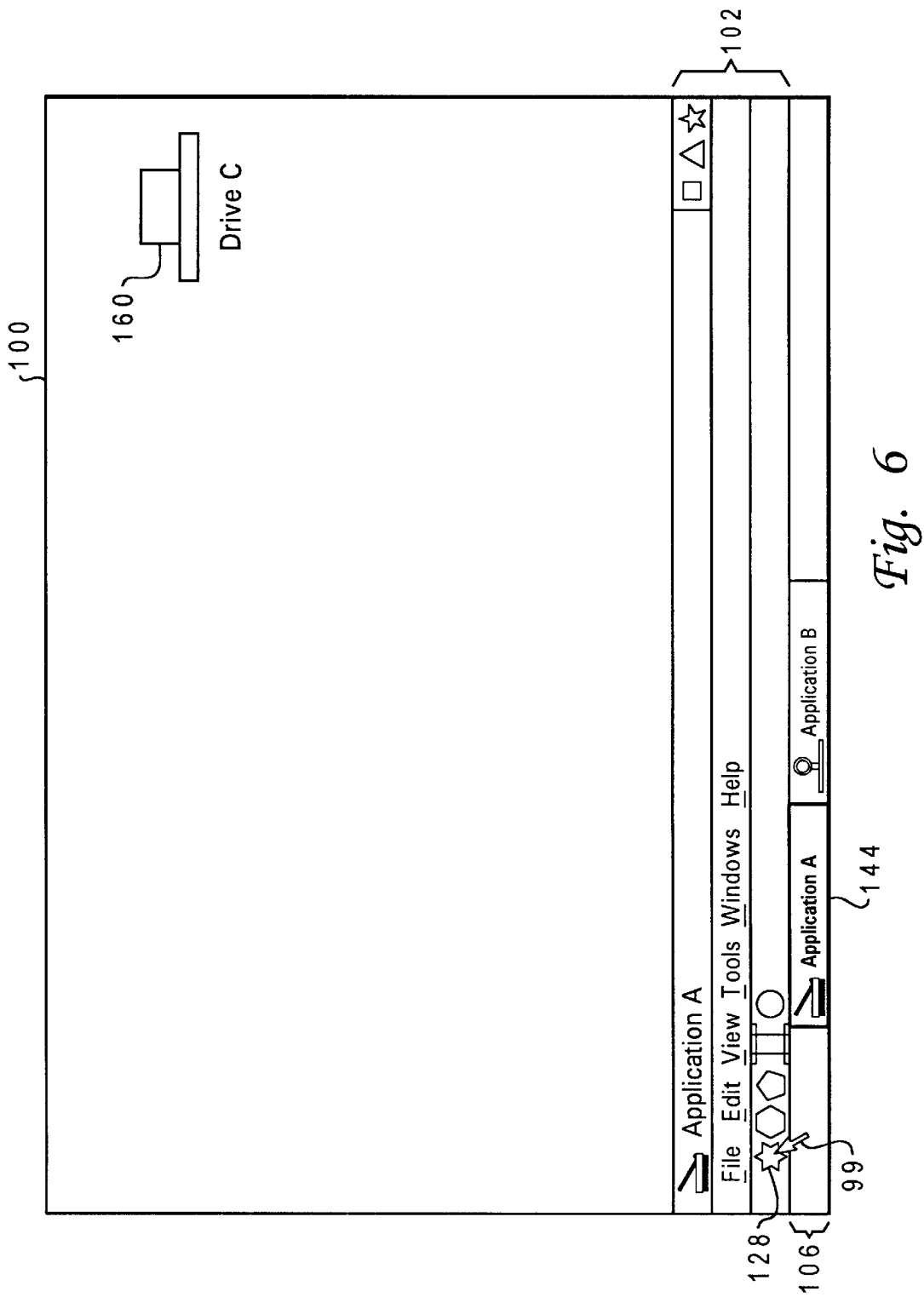
FIG. 6 illustrates a graphical user interface (GUI) display in accordance with the present invention that permits a user to select a graphical region of a graphical selection area which has an associated function.

Referring now to FIG. 6, there is illustrated a graphical user interface (GUI) display in accordance with the present invention that permits a user to select a graphical region of a graphical selection area which has an associated function. In response to a selection of active graphical object 144 in addition to a second input, graphical selection area 102 of Application A is displayed within display screen 100. In the present example, graphical selection area 102 is preferably displayed above active application menu 106, however the position of the graphical selection area 102 may vary. All the functions of graphical selection area 102 are available for execution upon selection. In particular, selection of icon 128 will launch a new Application C.

Graphical pointer 99 is depicted in FIG. 6, positioned over icon 128. In the present position of graphical pointer 99, if the user selects icon 128 by depressing a button on mouse 16, Application C, the application associated with icon 128, will be launched.

Figure 7:
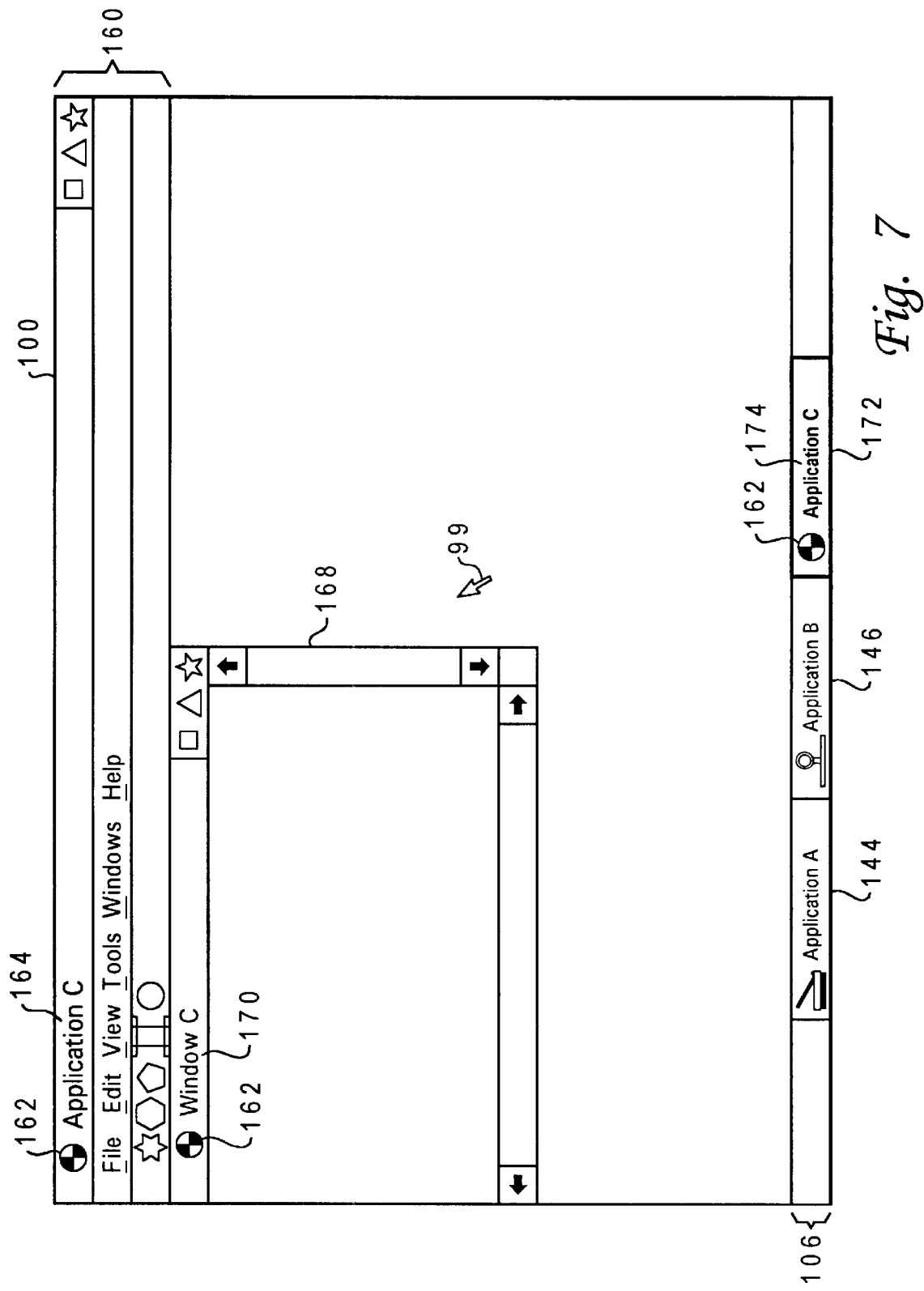
FIG. 7 depicts a graphical user interface (GUI) display in accordance with the present invention depicting the result of executing a selected function.

With reference now to FIG. 7, there is depicted a graphical user interface (GUI) display in accordance with the present invention depicting the result of executing a selected function. In response to a user selection of icon 128 from graphical selection area 102 of Application A, Application C is launched. Application C includes a graphical selection area 160 with components similar to those previously described in association with a graphical selection area. In graphical selection area 160, however, a distinct application icon 162 and application title "Application C" are illustrated at reference numeral 164. A graphical window 168 is also displayed within display screen 100. Graphical window 168 includes components similar to those previously described in association with a graphical window. However, graphical window 168 includes application icon 162 and window title "Window C" illustrated at reference numeral 170.

In FIG. 7, active application menu 106 includes active graphical objects 144, 146 and 172 where the application associated with active graphical object 172 is also currently displayed within display screen 100. Active graphical object 172 is associated with application C as illustrated at reference numeral 174.

Figure 8:
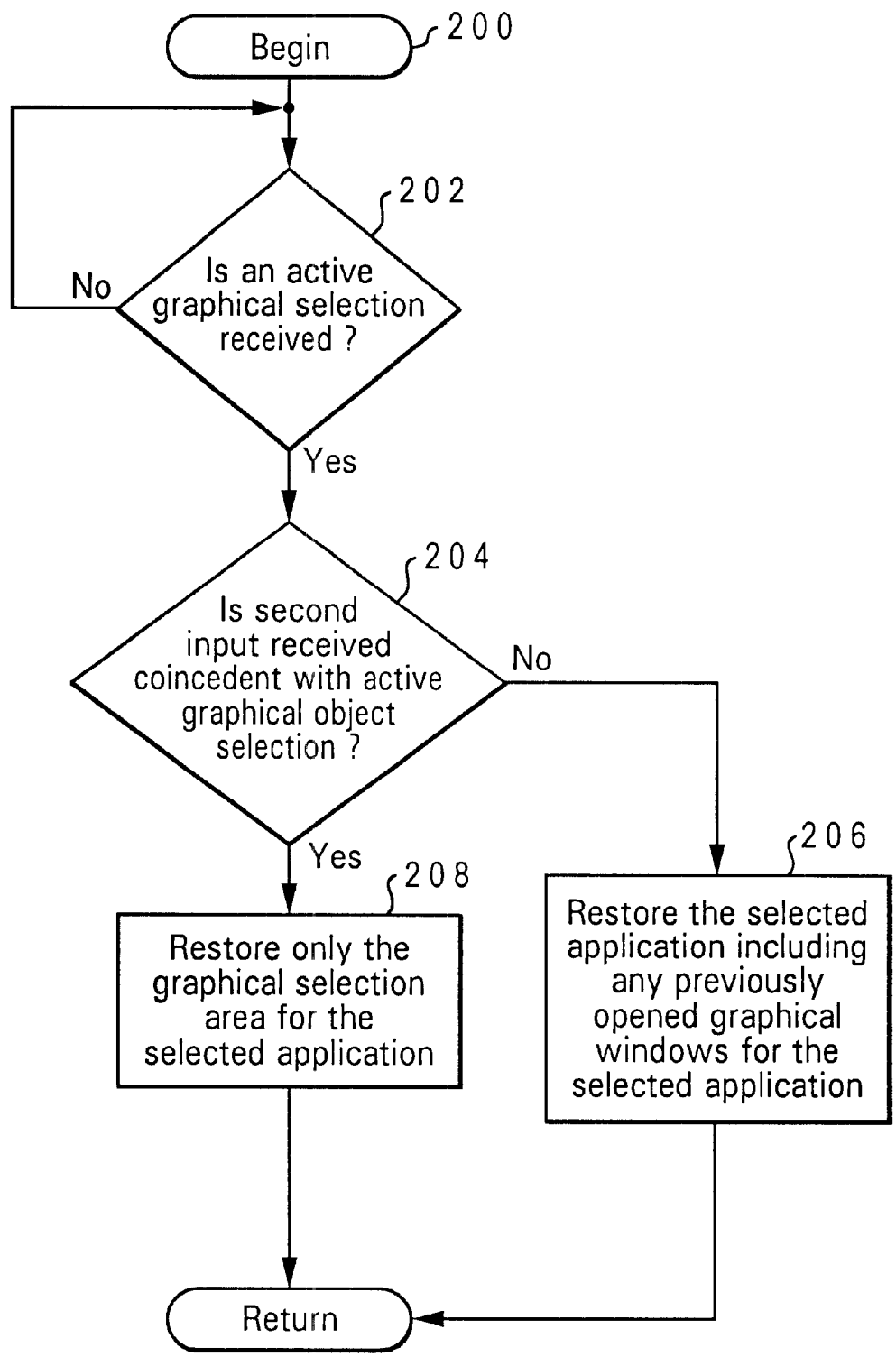
FIG. 8 is a high level logic flowchart illustrating a process for restoring an active application executed by a software object associated with a graphical user interface (GUI) in accordance with the present invention.
Figure 9:
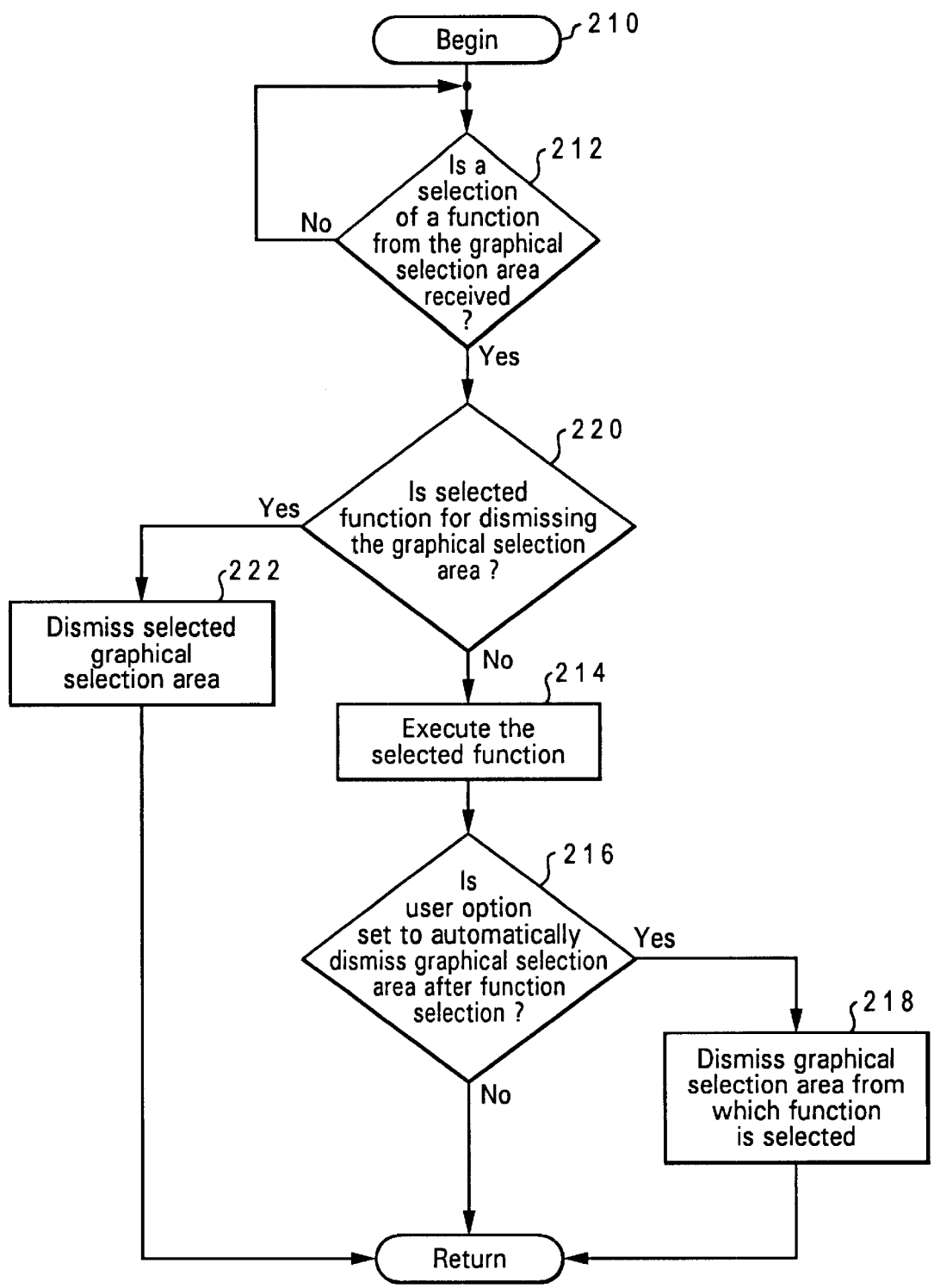
FIG. 9 is a high level logic flowchart depicting a process for initiating a function executed by a software object associated with a graphical user interface (GUI) in accordance with the present invention.

With reference now to FIGS. 8 and 9, the high level logic flowcharts depicted therein, illustrate a process executed by a software object associated with a graphical user interface (GUI) in accordance with the present invention. It should be appreciated by those skilled in the art that FIGS. 8 and 9 represent a self-consistent sequence of steps leading to a desired result. The steps are those requiring physical manipulation of physical quantities. Usually, although not necessarily, these quantities take the form of electrical or magnetic signals capable of being stored, transferred, combined, compared and otherwise manipulated. It has proven convenient at times by those skilled in the art to refer to these signals as bits, values, elements, symbols, characters, terms, numbers or the like. It should be born in mind, however, that all of these and similar terms are to be associated with the appropriate physical quantities and are merely convenient labels applied to those quantities.

Further, the manipulations performed are often referred to as terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data processing systems such as general purpose digital computers. In all cases the distinction between the method operations and operating a computer and the method of computation itself should be born in mind. The present invention relates to method steps for operating a processor such as microprocessor 30 of FIG. 2, in processing electrical or other physical signals to generate desired physical signals.

The high level logic flowchart of a process described in FIG. 8 is performed in response to receipt of a selection of an active graphical object by a software object within the graphical user interface manager. As depicted, the process begins at block 200 and thereafter passes to block 202. Block 202 depicts a determination of whether or not an active graphical object selection has been received. The user may select from active graphical objects displayed in an active application bar or menu as will be understood by one well known in the art. If a selection has been received, the process passes to block 204. If not, the process iterates at block 202 until such a time as a selection is received.

Block 204 depicts a determination of whether or not a second input is received coincident with the active graphical object selection. In response to the active graphical object selection alone at block 204, the process passes to block 206. Block 206 illustrates the restoration of the selected application including the graphical selection area and any previously opened graphical windows for the selected application. Thereafter, the process returns. However, at block 204, in response to a second input received coincident with the active graphical object selection, the process passes to block 208. The second input is preferably a keystroke, however the second input may also be a combination of mouse button selections or an input from another input device to the data processing system.

Block 208 depicts the restoration of only the graphical selection area for the selected application associated with the active graphical object selection. Thereafter, the process returns. Preferably, the graphical selection area is restored within the display screen in a position which differs from the position at which the graphical selection area is restored, in addition to any previously opened graphical windows.

With reference now to FIG. 9, there is illustrated a high level logic flowchart of a process performed in response to receipt of a function selected for execution from a graphical selection area by a software object associated with a graphical user interface (GUI) in accordance with the present invention. The graphical selection area has been invoked as depicted at block 208 in FIG. 8. As illustrated, the process described in FIG. 9 begins at block 210 and thereafter passes to block 212.

Block 212 depicts the determination of whether or not a selection of a function from among the available functions of a graphical selection area has been received. If not, the process iterates at block 212 until a function selection has been received. If a selection of a function has been received, the process passes to block 220. The function may be selected from a displayed icon function bar, pull-down menu bar, or other graphical objects which may be displayed which are associated with the graphical selection area. Block 220 illustrates the determination of whether or not the function selected will dismiss the graphical selection area. If the selected function is dismissing the graphical selection area, the process passes to block 222. Block 222 depicts the dismissal of the graphical selection area. However, if the selected function is not dismissing the graphical selection area, the process passes to block 214.

Block 214 illustrates the execution of the selected function. After execution of the selected function, the process passes to block 216. Block 216 depicts a determination of whether or not a user option is set to automatically dismiss a graphical selection area after a function is selected. Most operating systems preferably allow users to select from options for events in the operating system. In the present example, an option may be given to the user to automatically dismiss a graphical selection area which is invoked by selection with a second input. In response to a user option setting that allows the graphical selection area to be automatically dismissed, the process passes to block 218. If the graphical selection area is not automatically dismissed, the process returns. Block 218 illustrates the automatic dismissal of the graphical selection area from which the function is selected. If the graphical selection area is not automatically dismissed, the user may select from other functions of the graphical selection area, or select from a decoration field which includes a window function to dismiss the graphical selection area.

While the invention has been particularly shown and described with reference to a preferred embodiment, it will be understood by those skilled in the art that various changes in form and detail may be made therein without departing from the spirit and scope of the invention. For example, while the invention has been described utilizing a particular graphical display interface, alternate graphical display interfaces may be utilized to implement the present invention.

In addition, for example, although aspects of the present invention have been described with respect to a data storage system executing software that directs the method of the present invention, it should be understood that the present invention may alternatively be implemented as a computer program product for use with a data storage system or computer system. Programs defining the functions of the present invention can be delivered to a data storage system or computer system via a variety of signal-bearing media, which include, without limitation, non-writable storage media (e.g. CD-ROM), writable storage media (e.g. a floppy diskette or hard disk drive), and communication media, such as computer and telephone networks including ethernet. It should be understood, therefore, that such signal-bearing media, when carrying or encoding computer readable instructions that direct the method functions of the present invention, represent alternative embodiments of the present invention.

What is claimed is:

1. A method for efficiently invoking a function within a data processing system, said method comprising the steps of:

displaying a graphical application within a display device of a data processing system, wherein said graphical application has an associated graphical window and an associated graphical selection area, wherein said graphical selection area includes a plurality of regions that each have an associated function;

iconizing said graphical application such that said associated graphical window and associated graphical selection area are no longer displayed within said data processing system;

displaying said associated graphical selection area at a first location if the associated graphical selection area is to be displayed in response to a selection of said iconized graphical application, and at a second location if said associated graphical selection area is to be displayed in response to a selection of said iconized graphical application without any additional user inputs occurring in conjunction with said selection; and performing an associated function in response to selection of a particular region among said plurality of regions, such that said associated function may be invoked without displaying said associated graphical window.

2. The method of efficiently invoking a function within a data processing system according to claim 1, wherein said step of displaying said associated graphical selection area at a first location in response to selection of said iconized graphical application further comprises selecting said iconized graphical application in conjunction with a second input.

3. The method of efficiently invoking a function within a data processing system according to claim 2, wherein said second input comprises inputting a keystroke.

4. The method of efficiently invoking a function within a data processing system according to claim 2, wherein said second input comprises inputting a particular mouse function.

5. The method of efficiently invoking a function within a data processing system according to claim 1, and further comprising the step of:

in response to performing said associated function with said particular region, automatically dismissing said graphical selection area from display.

6. The method of efficiently invoking a function within a data processing system according to claim 1, wherein said plurality of regions of said graphical selection area further comprises a plurality of graphically selectable objects wherein said each of said plurality of regions includes at least one of said plurality of graphically selectable objects.

7. The method of efficiently invoking a function within a data processing system according to claim 6, wherein said plurality of graphically selectable objects further comprise icons.

8. The method of efficiently invoking a function within a data processing system according to claim 6, wherein said plurality of graphically selectable objects further comprise textual representations.

9. A data processing system, comprising:

a processing unit;

a display device coupled to said processing unit, wherein said display device displays a graphical application, wherein said graphical application has an associated graphical window and an associated graphical selection area, wherein said graphical selection area includes a plurality of regions;

a memory coupled to said processor unit;

a plurality of routines stored within said memory, wherein each of said plurality of routines is associated with one of said plurality of regions;

a graphical user interface manager stored within memory and executable by said processing unit, wherein in response to a selection of said graphical application, said graphical user interface invokes the opening of only said associated graphical selection area for display within said display device, wherein in response to a selection of a particular region among said plurality of regions, said graphical user interface invokes the execution of the routine among said plurality of routines that is associated with said particular region, wherein in response to receiving a dismiss command said graphical user interface manager displays said graphical application as an iconized graphical application; and wherein said graphical user interface manager causes said associated graphical selection area to be displayed at a first location if the associated graphical selection area is to be displayed in response to a selection of said iconized graphical application, and at a second location if said associated graphical selection area is to be displayed in response to a selection of said iconized graphical application without any addition user inputs occurring in conjunction with said selection.

10. The data processing system of claim 9, said data processing system further comprising:

a graphical pointing device, said graphical pointing device having a switch associated therewith;

wherein said graphical user interface manager manages display within said display device of said graphical application and said associated graphical selection area and a graphical pointer controlled by said graphical pointing device, and wherein said GUI manager determines that said graphical application is selected in response to closure of said switch while said graphical pointer is positioned over said graphical application and wherein said GUI manager determines that said associated graphical selection area is selected in response to closure of said switch while said graphical pointer is positioned over said associated graphical selection area.

11. The data processing system of claim 9, wherein said selection of a said graphical application comprises a selection of said graphical application in conjunction with a second input.

12. The data processing system of claim 11, wherein said second input comprises a keystroke input.

13. The data processing system of claim 9, wherein said in response to invoking said routine associated with said particular region, said graphical user interface manager dismisses said associated graphical selection area from display.

14. The data processing system of claim 9, wherein in response to a selection of said iconized graphical application without any additional user inputs occurring in conjunction with said selection, said graphical user interface manager opens said iconized graphical application, including said associated graphical window and said associated graphical selection area.

15. The data processing system of claim 9, wherein said plurality of regions of said graphical selection area further comprises a plurality of graphically selectable objects wherein said each of said plurality of regions includes at least one of said plurality of graphically selectable objects.

16. The data processing system of claim 15, wherein said plurality of graphically selectable objects further comprise icons.

17. The data processing system of claim 15, wherein said plurality of graphically selectable objects further comprise textual representations.

18. A program product for invoking a function within a data processing system, said program product comprising:

a data processing system usable medium; and an invoking program encoded with said data processing system usable medium that, in response to a selection of an iconized graphical application displayed within a display device of a data processing system, a graphical user interface manager invokes the opening a graphical selection area associated with said iconized graphical application at a first location if said associated graphical selection area is to be displayed in response to a selection of said iconized graphical application and at a second location if said associated graphical selection area is to be displayed in response to a selection of said iconized graphical application without any additional user inputs occurring in conjunction with said selection; and in response to a selection of a particular region among a plurality of regions of said graphical selection area, said graphical user interface manager invokes the execution of said function associated with said particular region.

19. The program product of claim 18, wherein said graphical user interface manager manages display within said display device of said iconized graphical application and said graphical selection area and a graphical pointer, and wherein said GUI manager determines that said graphical object is selected in response to receipt of a selected input while said graphical pointer is positioned over said iconized graphical application and wherein said GUI manager determines that said graphical selection area is selected in response to receipt of a selected input while said graphical pointer is positioned over said graphical selection area.

20. The program product of claim 18, wherein said selection of a said iconized graphical application comprises a selection of said iconized graphical application in conjunction with a selection of a second input.

21. The program product of claim 20, wherein said second input comprises a keystroke input.

22. The program product of claim 18, wherein in response to invoking said function associated with said particular region, said graphical user interface manager dismisses said graphical selection area from display.

23. The program product of claim 18, wherein said graphical user interface manager displays a graphical window and a graphical selection area, associated with a particular application, within said display device, and wherein in response to receiving a dismiss command, said graphical user interface manager iconizes said graphical application, and closes said associated graphical window and said associated graphical selection area from display.

24. The program product of claim 18, wherein said plurality of regions of said graphical selection area further comprises a plurality of graphically selectable objects wherein said each of said plurality of regions includes at least one of said plurality of graphically selectable objects.

25. The program product of claim 24, wherein said plurality of graphically selectable objects further comprise icons.

26. The program product of claim 24, wherein said plurality of graphically selectable objects further comprise textual representations.

* * * * *